May 11, 1965     F. C. MELCHIOR     3,182,510
APPARATUS FOR MEASURING SPECIFIC GRAVITIES OF HYDROCARBONS
Filed Oct. 2, 1962     2 Sheets-Sheet 1
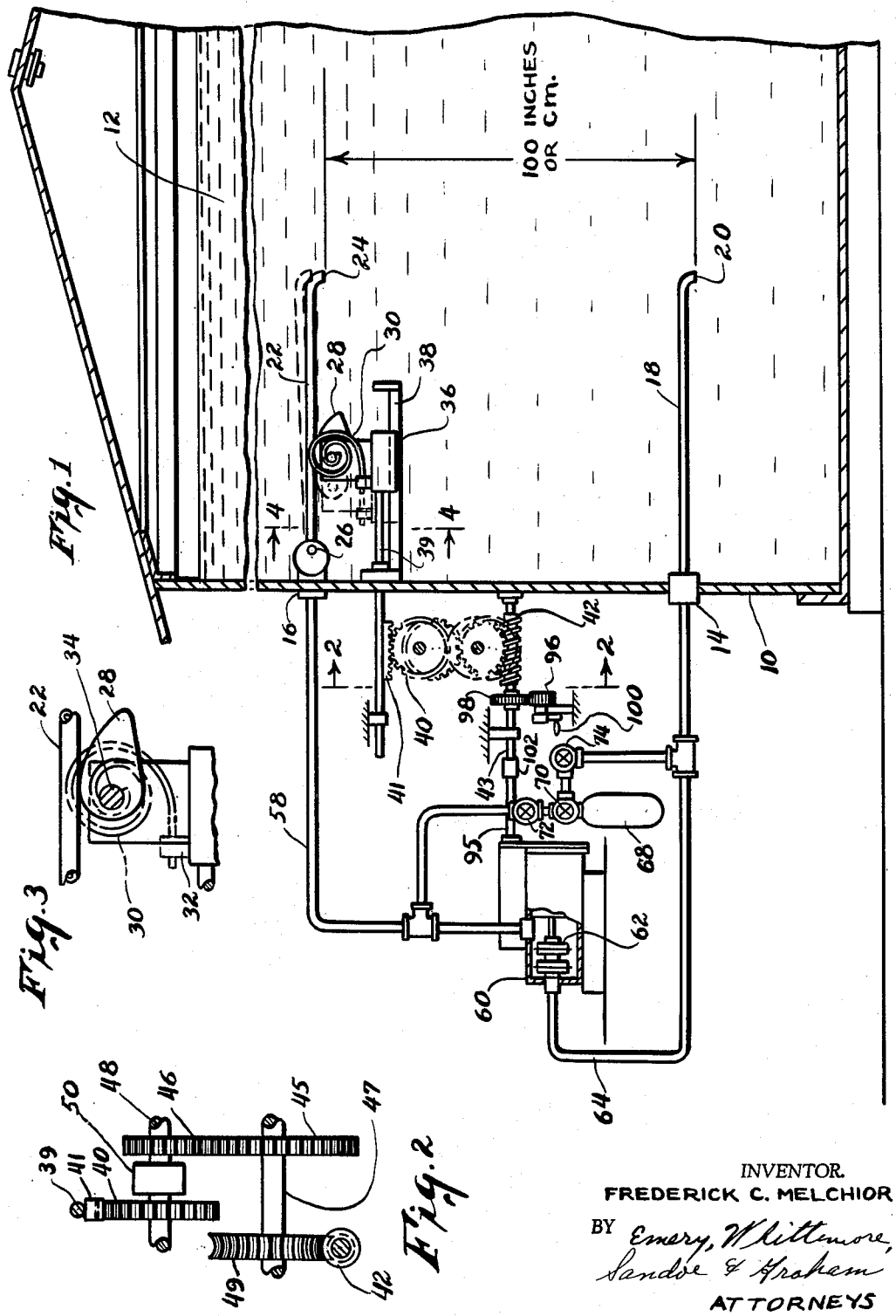
INVENTOR.
FREDERICK C. MELCHIOR
BY *Emery, Whittemore,*
*Sandoe & Graham*
ATTORNEYS May 11, 1965 F. C. MELCHIOR 3,182,510
APPARATUS FOR MEASURING SPECIFIC GRAVITIES OF HYDROCARBONS
Filed Oct. 2, 1962 2 Sheets-Sheet 2
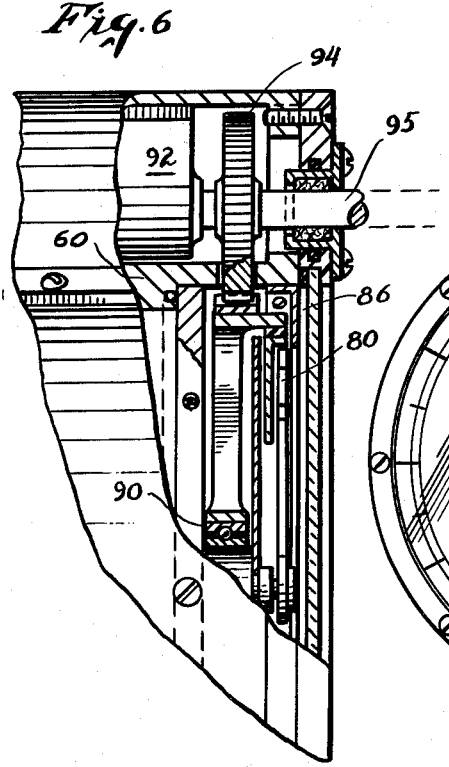
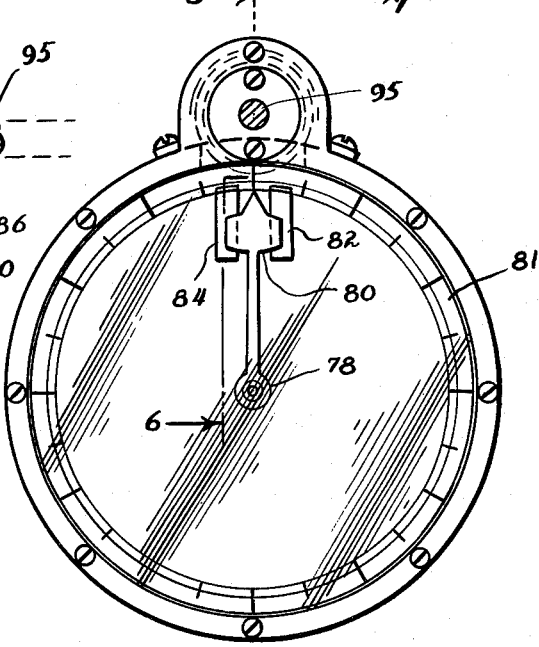
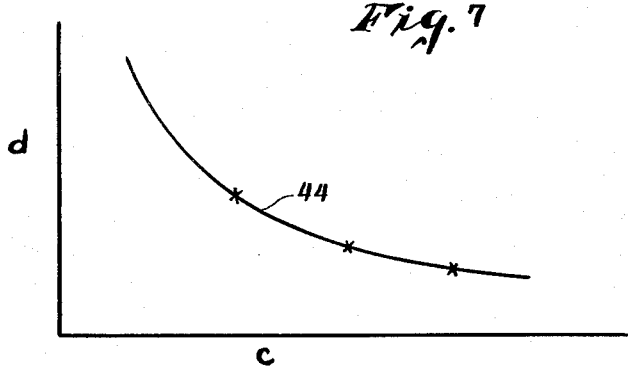
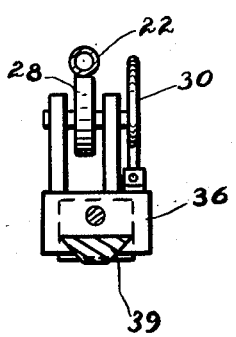
INVENTOR.
FREDERICK C. MELCHIOR
BY
ATTORNEYS United States Patent Office 3,182,510
Patented May 11, 1965

3,182,510
APPARATUS FOR MEASURING SPECIFIC
GRAVITIES OF HYDROCARBONS
Frederick C. Melchior, 258 Riverside Drive,
New York, N.Y.
Filed Oct. 2, 1962, Ser. No. 227,810
4 Claims. (Cl. 73—438)

This invention relates to an apparatus for measurement of specific gravity and, more particularly, to an apparatus for the measurement of specific gravity of unknown liquid hydrocarbons at unknown ambient temperatures.

It is the primary object of this invention to provide an improved apparatus for measurement of the specific gravity for fluids having known variations in the expansion coefficients with density by measurement of the differential pressure of a liquid column of the material and by continuously adjusting the height of the column to compensate for the ambient temperature and the density of the material measured.

In accordance with this object, there is provided in a preferred embodiment of this invention, a specific gravity measuring apparatus comprising a differential pressure measuring instrument to measure the difference in pressure between the top and the bottom of a liquid column. Means are provided to vary the height of the liquid column in accordance with both the ambient temperature and the density of the liquid thereby to provide an automatic indication of basic specific gravity over the entire range of ambient temperatures and anticipated densities of fluids.

Other objects and advantages of this invention will be pointed out hereinafter in the accompanying detailed description of the specification, which may best be understood by reference to the accompanying drawings, of which:

FIG. 1 is a partially sectioned schematic view of an installation in accordance with the present invention;

FIG. 2 is a sectioned view taken along lines 2—2 of FIG. 1;

FIG. 3 is an elevation view of a portion of the apparatus shown in FIG. 1;

FIG. 4 is a section view taken along lines 4—4 of FIG. 1;

FIG. 5 is a plan view of an instrument face utilized in the apparatus shown in FIG. 1;

FIG. 6 is a section view taken along lines 6—6 of FIG. 5; and

FIG. 7 is a plot of the coefficient of thermal expansion of liquid hydrocarbons as a function of density.

In the figures, there is shown a storage tank 10 within which is contained a stored quantity of liquid hydrocarbons 12 such as gasoline. In order to measure the specific gravity of the stored fluid, there is provided couplings 14 and 16 to communicate with the fluid. The couplings are located at a precise, known separation distance which may be conveniently 100 in. or 100 cm. in order to enable direct comparison of the differential pressure of the column of liquid between the two couplings with a column of water of the same height in order to provide a ratio therebetween, which ratio is the definition of the specific gravity at a predetermined referenced temperature, usually 4° C. for water and 60° F. for hydrocarbons.

An intake pipe 18 is sealedly received through coupling 14 to measure the column pressure at the open end 20 thereof. Similarly, a pipe 22 is provided to measure the pressure in the open end 24 at the top of the column. However, pipe 22 is hingedly connected to the coupling 16 by sealed joint hinge 26 to enable the pipe to be deflected about the hinge.

In order to control height deflection and, thus, the height of the column, there is provided a cam 28. The cam is rotated by a temperature responsive element such as a Bourdon tube 30, one end of which is coupled to the shaft 34 of the cam. Thus, as the temperature changes, the cam will rotate to deflect the pipe 22 and to change the effective column between the top and bottom pipes. By matching the cam surface to correspond with the thermal coefficient of expansion of the fluid, compensation may be achieved for any specific fluid density.

Since, however, fluid density is similarly dependent upon the ambient temperature of the fluid, it is necessary to provide means for changing the lever arm at which the cam is applied. This is provided by mounting the cam on a carriage 36 which is movably mounted on track 38 and is driven thereover by push rod 39. The push rod 39 is driven by an output gear 40 of a transmission which engages rack 41 on the push rod 39. The transmission is driven by rotation of worm gear 42, fixedly mounted on shaft 43. Since the curve 44 (FIG. 7) of thermal coefficients as a function of density is a non-linear function, the transmission is preferably non-linear to match the curve. For this purpose, gears 45, 46 are mounted eccentrically on shafts 47, 48 respectively. On shaft 47, gear 49 is concentrically mounted and engages worm gear 42. Thus, as the worm gear 42 is driven, it will rotate shaft 47 through gear 49. The rotation of output gear 40 will, however, not be directly related to rotation of the shaft 47 because rotation of the eccentrically mounted gears will change the gear ratio during rotation. Although the eccentrically mounted gears provide a simple and efficient non-linear transmission, it will be recognized that the backlash may be introduced in such arrangement and a spring loaded differential 50 is advantageously used to reduce backlash. More sophisticated transmission may be employed if necessary, but, in the majority of applications, the transmission disclosed will be effective and economical.

The pressure from the top pipe 22 is applied over line 58 to the casing 60 of a differential pressure measuring instrument consisting of stacked differential capsules 62. The pressure from the bottom pipe 18 is applied over line 64 to the inside of the differential capsules. To enable mounting of the instrument at any convenient location and to prevent entry of the fluid into the instrument, both lines are purged by inert gas stored under pressure in container 68 and trickled into lines 58 and 64 through a pressure dropping valve 70 and metering valves 72 and 74 respectively. The gas flow should be sufficiently low so as not to influence the pressure measurement, but to maintain the lines free from the entry of fluids therein.

The differential pressure between the top and bottom lines will, of course, deflect the differential capsules, which deflection is indicated by movement of the pointer 78 in conventional fashion as, for example, by the drive mechanism set forth in U.S. Patent No. 2,636,394 for Instrument Actuating Mechanism. The indicator pointer is provided with a plate area 80 which is tracked by the separated capacitor plates 82 and 84 mounted upon a ring gear 86. The ring gear 86 is rotatably mounted via bearing 90 for rotation in the same plane as the plane of movement of the pointer 78. The ring gear is driven by a servo motor 92 through a pinion 94 on the motor shaft 95 to maintain a null balance between the measured capacitance between plates 82 and 84 with respect to the plate 80. Thus, the ring gear will continuously track the pointer rotation by maintaining null balance between the capacitor plates astraddle the pointer. Null balance servo drives are conventional in the art and the circuitry is not included here for simplicity of explanation of the pertinent portions of this invention. Any similar types of drive set ups such as photoelectric, followup or magnetic tracking may be utilized.

The rotation of the shaft 43, as the servo tracks the pointer, will result in movement of the worm gear 42 and push rod 39. For manual operation and for calibration, a hand wheel 97 is provided to engage pinion 98 on shaft 43. A hand crank 100 is provided for rotation.

To calibrate the instrument, a fluid of known specific gravity is introduced into the tank at the reference temperature. The needle 80 will move to indicate the measured differential pressure. Since the liquid is introduced at the reference temperature, cam 28 will remain in what may be termed a neutral position and the upper pressure line will be horizontal to maintain the column height between upper and lower pressure lines at the specified distance (100 in. or 100 cm.). Thus, the needle will be the true specific gravity and the dial 81 is marked with the known specific at the then needle position. The temperature is then changed to a known temperature different from the reference temperature. Since the instrument measures specific gravity, the needle should not move and the rotation of cam 28 should compensate for the temperature change. If the needle does move, the crank is rotated, changing the lever arm to the cam 28 until the needle returns to the marked position. The motor shaft is then turned until the plates 82, 84 are astraddle the pointer. While auxiliary indicator markers can be employed, centering by eye is very precise without other markers.

The coupling 102 is then locked so that shafts 43 and 95 are coupled for conjoint rotation.

The plates 82, 84 are then energized so that the servo will track the needle. The movement of the cam 28 in accordance with measured pressure column weight will cause a variation in the temperature response displacement of the end 24 to vary with density. Thus, the indicator will always indicate specific gravity of an unknown fluid despite temperature variations.

Alternatively, the dial may be calibrated in terms of inches of water (preferably marked, however, in decimal equivalents of a fixed column for direct specific gravity readings) prior to system installation. The fluid introduced for calibration must have a known specific gravity. However, the temperature of the fluid can be any known temperature as long as it is different from the reference temperature. The needle will deflect and the crank is rotated until the needle indication reads the specific gravity of the fluid. The coupling 102 is then locked.

Since the transmission is non-linear and matches the curve 44 which is a plot of the temperature coefficient vs. density of hydrocarbons, the dial can be marked in equal increments from the one calibration fluid. If the transmission does not match the curve, the dial markings will be non-linear and must be calibrated over the operating range.

In the event of power failure, tracking of the needle by plates 82, 84 can be effected by hand crank 100.

This invention may be variously modified and embodied within the scope of the subjoined claims.

What is claimed is:
1. An arrangement for measuring the specific gravity of a fluid at ambient temperatures comprising a first substantially horizontal pressure line, a second substantially horizontal pressure line, hingedly coupled at one end thereof, and at fixed predetermined distance above said first line, means for measuring the difference in pressure in said first and second lines and providing an indication therefor, means for rotatably deflecting said second pressure line about said hinged mounting in accordance with changes in temperature, said last named means comprising a cam and a thermostatically responsive element to rotate said cam, said cam being mounted so that the surface of said cam bears against said second pressure line to rotate said line with changes in temperature, and means for changing the position of said cam along said second pressure line, in response to said indication, said named means comprising a horizontal supporting track and a carriage mounted on said track and movable thereon, said carriage carrying said cam and temperature responsive element.

2. An arrangement in accordance with claim 1 in which said means for changing said position of said cam comprises a hand crank and a second indicator rotatable with rotation of said crank, said second indicator being superimposed on said first indicator.

3. An arrangement in accordance with claim 1 in which said means for changing said position of said cam comprises servo means responsive to said indication, a non-linear transmission coupled to said servo, and a push rod coupled to said carriage, said transmission being coupled to said push rod to move said rod nonlinearly with servo rotation.

4. A device for measuring specific gravities of fluids comprising a pair of vertically spaced pressure lines, one of said lines being pivotally mounted at one end thereof, a differential pressure measuring instrument to measure the difference in pressure between said lines and to provide an indication thereof, temperature responsive means in contact with said pivotally mounted pressure line to vertically deflect said line about said pivot with temperature changes and means for moving said temperature responsive means along the said pivotally mounted pressure line, said moving means being calibrated in conformance with said indication supplied by said differential pressure measuring instrument to compensate for variations in the expansion coefficient with density of said fluids.

References Cited by the Examiner
UNITED STATES PATENTS

| | | | |
|---|---|---|---|
| 1,178,902 | 4/16 | Brindle | 73—438 |
| 2,056,187 | 10/36 | Hay | 73—438 |
| 2,577,548 | 12/51 | Vetter | 73—393 |
| 2,662,757 | 12/53 | Mock | 73—393 |
| 3,045,489 | 7/62 | Brandt | 73—393 |

RICHARD C. QUEISSER, *Primary Examiner.*